(12) United States Patent
Lee et al.

(10) Patent No.: US 12,551,143 B2
(45) Date of Patent: Feb. 17, 2026

(54) APPARATUS AND METHOD FOR MEASURING TRIGLYCERIDE LEVEL

(71) Applicant: SAMSUNG ELECTRONICS CO., LTD., Suwon-si (KR)

(72) Inventors: Joon Hyung Lee, Suwon-si (KR); Byung Hoon Ko, Suwon-si (KR); Yeol Ho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 409 days.

(21) Appl. No.: 18/134,931

(22) Filed: Apr. 14, 2023

(65) Prior Publication Data

US 2024/0138722 A1 May 2, 2024

(30) Foreign Application Priority Data

Nov. 1, 2022 (KR) ........................ 10-2022-0143419

(51) Int. Cl.
| | |
|---|---|
| *A61B 5/145* | (2006.01) |
| *A61B 5/00* | (2006.01) |
| *A61B 5/1455* | (2006.01) |

(52) U.S. Cl.
CPC ........ *A61B 5/14546* (2013.01); *A61B 5/1455* (2013.01); *A61B 5/7246* (2013.01); *A61B 5/7264* (2013.01); *A61B 2562/046* (2013.01)

(58) Field of Classification Search
CPC .............. A61B 5/1455; A61B 5/14552; A61B 5/14546; A61B 5/7246; A61B 5/7264; A61B 2562/046
See application file for complete search history.

(56) References Cited

U.S. PATENT DOCUMENTS

| | | | |
|---|---|---|---|
| 10,349,847 B2 | 7/2019 | Kwon et al. | |
| 10,694,997 B2 | 6/2020 | Kim et al. | |
| 11,141,073 B2 | 10/2021 | Park et al. | |
| 11,147,521 B2 | 10/2021 | Choi et al. | |
| 11,331,044 B2 | 5/2022 | Nam et al. | |
| 11,530,948 B2 | 12/2022 | Chang et al. | |
| 2016/0113530 A1 | 4/2016 | Nagahiro et al. | |
| 2019/0200866 A1* | 7/2019 | Eom .................... | A61B 5/1455 |
| 2020/0205681 A1 | 7/2020 | Putila et al. | |

FOREIGN PATENT DOCUMENTS

| | | |
|---|---|---|
| JP | 2017-136183 A | 8/2017 |
| KR | 10-2016-0047964 A | 5/2016 |
| KR | 10-2016-0088127 A | 7/2016 |
| KR | 10-2019-0065089 A | 6/2019 |
| KR | 10-2021-0075648 A | 6/2021 |
| KR | 10-2390369 B1 | 4/2022 |

* cited by examiner

*Primary Examiner* — Eric F Winakur
(74) *Attorney, Agent, or Firm* — Sughrue Mion, PLLC

(57) ABSTRACT

An apparatus for measuring a triglyceride level includes: a sensor including: a plurality of peripheral light sources disposed at a periphery thereof, the plurality of peripheral light sources being configured to emit light toward an object, and a plurality of detectors each disposed at predetermined distances from the respective peripheral light sources of the plurality of peripheral light sources, the plurality of detectors being configured to detect optical signals reflected from or scattered by the object. The apparatus also includes a processor configured to selectively drive the plurality of peripheral light sources to obtain features based on the detected optical signals, and to measure the triglyceride level based on the obtained features.

17 Claims, 13 Drawing Sheets

APPARATUS AND METHOD FOR MEASURING TRIGLYCERIDE LEVEL

CROSS-REFERENCE TO RELATED APPLICATION(S)

This application claims priority from Korean Patent Application No. 10-2022-0143419, filed on Nov. 1, 2022, in the Korean Intellectual Property Office, the entire disclosure of which is incorporated herein by reference for all purposes.

BACKGROUND

1. Field

The following description relates to technology for non-invasively measuring triglyceride levels.

2. Description of the Related Art

Blood triglyceride levels rise and fall at an interval of 6 to 7 hours after fat intake. Regarding healthcare, measuring a variation in triglyceride levels after fat intake provides an important health indicator, such as an amount of fat intake, and fat dissolving ability.

Methods for measuring triglyceride levels may include an invasive method of collecting and analyzing blood at an interval of 15 to 20 minutes. The invasive method of measuring blood triglyceride levels is highly reliable in measurement, but the use of injection may cause pain during blood sampling, inconvenience, and a risk of infection. Recently, research has been conducted on a method of non-invasively estimating triglyceride levels by measuring optical properties without direct blood sampling.

SUMMARY

An apparatus for measuring a triglyceride level may include: a sensor including: a plurality of peripheral light sources disposed at a periphery thereof, the plurality of peripheral light sources being configured to emit light toward an object, and a plurality of detectors each disposed at predetermined distances from the respective peripheral light sources of the plurality of peripheral light sources, the plurality of detectors being configured to detect optical signals reflected from or scattered by the object. The apparatus may also include a processor configured to selectively drive the plurality of peripheral light sources to obtain features based on the detected optical signals, and to measure the triglyceride level based on the obtained features.

The predetermined distances may be each within a range of 2.5 mm to 15 mm.

The sensor may further include one or more central light sources disposed at a center thereof. The plurality of detectors may be each disposed at second predetermined distances from the respective central light sources of the one or more central light sources that are each within a range of 2.5 mm to 7.5 mm.

At least one of the plurality of peripheral light sources may be configured to emit light in an infrared wavelength range, and at least one of the one or more central light sources may be configured to emit light in a green wavelength range.

The plurality of detectors may be arranged as a photodiode array.

The processor may be configured to sequentially drive the plurality of peripheral light sources in a time-division manner.

The processor may be configured to obtain an effective attenuation coefficient based on the detected optical signals by driving the plurality of peripheral light sources.

The processor may be configured to measure the triglyceride level based on the obtained effective attenuation coefficient by using a triglyceride estimation model that defines a correlation between the effective attenuation coefficient and the triglyceride level.

The processor may be configured to obtain an augmentation index based on optical signals detected by driving the one or more central light sources.

The processor may be configured to measure the triglyceride level based on the effective attenuation coefficient and the augmentation index by using a predetermined triglyceride estimation model.

The processor may be configured to provide a user with health guidance, including at least one of warning information, diet information, or exercise information, based on the measured triglyceride level.

A method of measuring a triglyceride level may include: selectively driving, by a processor, a plurality of peripheral light sources disposed at a periphery of a sensor to emit light toward an object; detecting optical signals reflected from or scattered by the object by using a plurality of detectors on the sensor each disposed at predetermined distances from respective peripheral light sources of the plurality of peripheral light sources; obtaining features based on the detected optical signals; and measuring the triglyceride level based on the obtained features.

The method may further include providing a user with health guidance, including at least one of warning information, diet information, or exercise information, based on the measured triglyceride level.

The obtaining the features may include obtaining an effective attenuation coefficient based on the detected optical signals by driving the plurality of peripheral light sources.

The measuring the triglyceride level may include measuring the triglyceride level based on the obtained effective attenuation coefficient by using a triglyceride estimation model that defines a correlation between the effective attenuation coefficient and the triglyceride level.

The method may further include: driving, by the processor, one or more central light sources disposed at a center of the sensor to emit light toward the object. The obtaining the features may further include obtaining an augmentation index based on the detected optical signals by driving the one or more central light sources.

The measuring the triglyceride level may include measuring the triglyceride level based on the effective attenuation coefficient and the augmentation index by using a predetermined triglyceride estimation model.

A wearable device may include: a memory configured to store one or more instructions; and a processor which, by executing the one or more instructions, is configured to: selectively drive a plurality of light sources of a sensor to emit light toward an object, obtain features by pulse wave analysis based on optical signals detected by a plurality of detectors of the sensor, the optical signals being reflected from or scattered by the object, and measure a triglyceride level based on the obtained features.

The plurality of light sources may include a plurality of peripheral light sources disposed at a periphery of the sensor, and one or more central light sources disposed at a center of the sensor.

The plurality of detectors may be each disposed at first predetermined distances from respective peripheral light sources of the plurality of peripheral light sources, the first predetermined distances being each within a range of 2.5 mm to 15 mm. The plurality of detectors may be each disposed at second predetermined distances from respective central light sources of the one or more central light sources, the second predetermined distances being each within a range of 2.5 mm to 7.5 mm.

Figure 1:
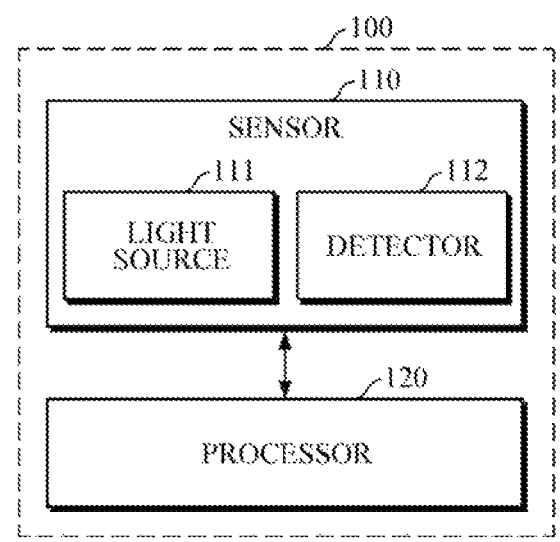
FIG. 1 is a block diagram illustrating an apparatus for measuring a triglyceride level according to an embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Details of other embodiments are included in the following detailed description and drawings. Advantages and features of the present invention, and a method of achieving the same will be more clearly understood from the following embodiments described in detail with reference to the accompanying drawings. Throughout the drawings and the detailed description, unless otherwise described, the same drawing reference numerals will be understood to refer to the same elements, features, and structures.

It will be understood that, although the terms first, second, etc. may be used herein to describe various elements, these elements should not be limited by these terms. These terms are only used to distinguish one element from another. Any references to singular may include plural unless expressly stated otherwise. In addition, unless explicitly described to the contrary, an expression such as "comprising" or "including" will be understood to imply the inclusion of stated elements but not the exclusion of any other elements. Also, the terms, such as "unit" or "module", etc., should be understood as a unit for performing at least one function or operation and that may be embodied as hardware, software, or a combination thereof.

Hereinafter, various embodiments of an apparatus and method for measuring a triglyceride level will be described with reference to the accompanying drawings. Various embodiments thereof may be included in an electronic device, such as a smartphone, a tablet PC, a desktop computer, a laptop computer, or a wearable device such as a wristwatch-type wearable device, a bracelet-type wearable device, a wristband-type wearable device, a ring-type wearable device, a glasses-type wearable device, an earphone-type wearable device, a necklace-type wearable device, an anklet-type wearable device, a headband-type wearable device, and the like. While the following description is given of an apparatus for measuring a triglyceride level, the apparatus for measuring a triglyceride level may be an example of an apparatus for measuring a biological material in particle form (e.g., diameter ≥10 nm). Accordingly, the following description may also be applied to the apparatus for measuring a biological material in particle form having a diameter of 10 nm or less, in addition to triglycerides.

FIG. 1 is a block diagram illustrating an apparatus for measuring a triglyceride level according to an embodiment of the present disclosure.

Referring to FIG. 1, an apparatus 100 for measuring a triglyceride level includes a sensor 110 and a processor 120. The sensor 110 may include a light source 111 for emitting light to an object and a detector 112 for detecting an optical signal reflected or scattered from the object.

The light source 111 may include, for example, a light emitting diode (LED), a laser diode, and/or a phosphor. There may be one or more light sources 111, each of which may emit light of different wavelengths (e.g., red, green, blue, and infrared wavelengths). For example, triglyceride levels may be measured by using the light source 111 which emits light suitable for a wavelength range of a light source included in a wearable device, and emits light in an infrared wavelength range (e.g., 800 nm to 1000 nm) except for a wavelength region in which hemoglobin absorption is very high (e.g., 400 nm to 800 nm). The wavelength range of light which may be emitted by the light source 111 is not limited thereto.

The detector 112 may include, for example, a photo diode, a photo transistor (PTr), a Complementary Metal Oxide Semiconductor (CMOS) image sensor, and/or a charge-coupled device (CCD) image sensor. The detector 112 may be formed as a plurality of detectors or a detector array. The type and arrangement of the detector 112 is not limited thereto.

The sensor 110 may have, for example, a circular or tetragonal structure. In the case where the sensor 110 has a circular structure (e.g., concentric circle having a diameter of 15 mm or less), the light sources 111 may be disposed in a concentric shape at a periphery of a concentric circle or may be disposed only at the center of the concentric circle, or may be disposed at both the periphery and the center thereof. Also, in the case where the sensor 110 has a tetragonal structure (e.g., tetragonal structure with each side having a length of 15 mm or less), the light sources 111 may be disposed at a periphery of the structure or may be disposed only at the center of the structure, or may be disposed at both the periphery and the center thereof. However, the arrangement of the light sources 111 is not limited thereto. The following description will be given using an example in which the sensor 110 has a circular structure.

Figure 2A:
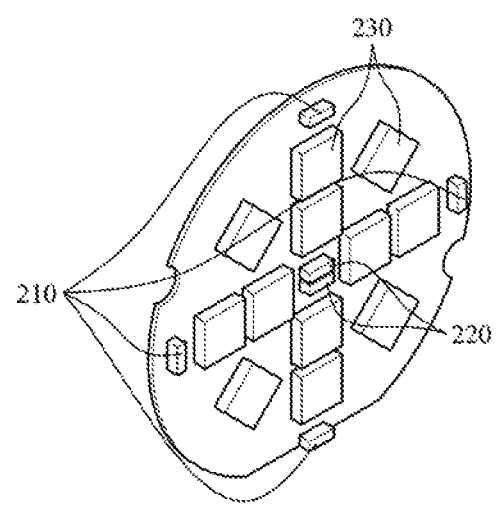
FIGS. 2A to 2C are diagrams illustrating the arrangement of light sources and detectors according to an embodiment of the present disclosure.
Figure 2B:
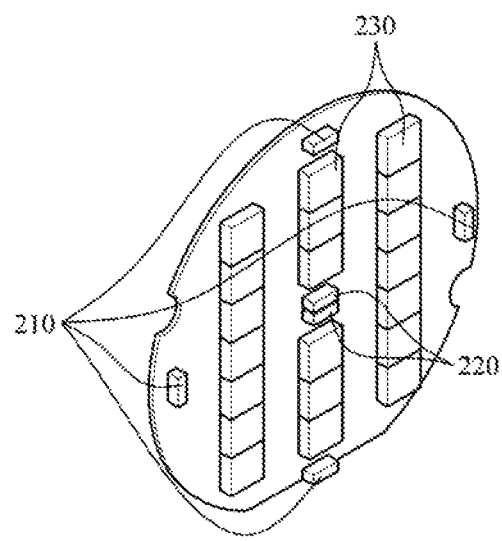
Figure 2C:
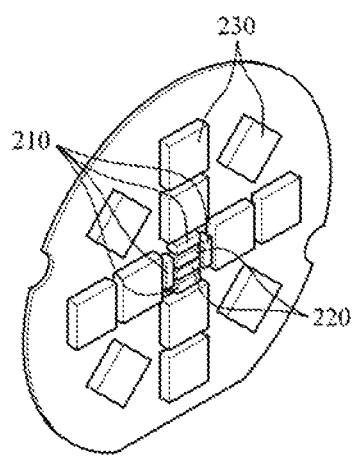

FIGS. 2A to 2C are diagrams illustrating the arrangement of light sources and detectors according to an embodiment of the present disclosure.

For example, light may be emitted to an object by a plurality of light sources, which are arranged around the periphery of a concentric circle, and one or more light sources which are disposed at the center of the concentric circle, and optical signals reflected or scattered from the object may be detected by detectors disposed at a predetermined distance from the respective light sources.

Referring to FIG. 2A, for example, a plurality of light sources 210 (e.g., four) may be disposed at the periphery of the concentric circle, and one or more light sources (e.g., two) may be disposed at the center of the concentric circle. In this case, at least one of the light source, arranged around the periphery of the concentric circle, may emit light in an infrared wavelength range (e.g., 940 nm), and at least one of the light sources disposed at the center of the concentric circle may emit light in a green wavelength range (e.g., 535 nm).

A plurality of detectors 230 (e.g., twelve detectors 230) may be disposed at a predetermined distance from the light sources 210 and 220. In this case, the predetermined distance between the respective light sources 210, disposed at the periphery of the concentric circle, and the respective detectors 230 may be in a range of from 2.5 mm to 15 mm, and a distance between the respective light sources 220, disposed at the center of the concentric circle, and the respective detectors 230 may be in a range of from 2.5 mm to 7.5 mm.

Referring to FIG. 2B, the detectors 230 may be disposed in an array at a predetermined distance from the light sources 210 and 220, and may be formed as a photodiode array. The arrangement of the detectors 230 is not limited thereto.

In another example, the plurality of light sources disposed at the center of the concentric circle may emit light to an object, and the detectors disposed at a predetermined distance from the respective light sources may detect optical signals reflected or scattered from the object.

Referring to FIG. 2C, for example, the plurality of light sources 210 emitting light in an infrared wavelength range and the plurality of light sources 220 emitting light in a green wavelength range may be disposed at the center of the concentric circle. The detectors 230 may be disposed at a predetermined distance from the plurality of light sources 210 and 220, and a distance between the respective light sources, disposed at the center of the concentric circle, and the respective detectors may be for example, in a range of from 2.5 mm to 7.5 mm.

Referring back to FIG. 1, the processor 120 may be connected to the sensor 110 to control the sensor 110, may receive data from the sensor 110, and may measure bio-information by using the received data. In this case, the processor 120 may obtain data by selectively driving the plurality of light sources. For example, the processor 120 may sequentially drive the plurality of light sources 111 in a time-division manner according to predetermined criteria for driving the light sources. In this case, the plurality of light sources 111 may emit not only light of the same wavelength but also light of different wavelengths.

The processor 120 may obtain features based on the optical signals detected by selectively driving the plurality of light sources, and may measure bio-information based on the obtained features. In this case, the bio-information may include triglyceride, skeletal muscle, fat mass, blood pressure, blood glucose, calories, skin carotenoid, blood carotenoid, glucose, urea, lactate, total protein, cholesterol, ethanol, vascular age, arterial stiffness, aortic pressure waveform, stress index, and/or fatigue level. For convenience of explanation, the following description will be given using triglyceride as an example.

For example, the processor 120 may obtain an effective attenuation coefficient as a feature based on the detected optical signals, and may measure a triglyceride level based on the obtained effective attenuation coefficient. In this case, the processor 120 may obtain the effective attenuation coefficient based on optical signals detected by driving a plurality of light sources disposed at the periphery of a concentric circle.

Referring back to FIG. 2A, for example, the processor 120 may extract optical signals from 12 detectors and four light sources disposed at the periphery of the concentric circle and emitting light in an infrared wavelength range, may obtain the effective attenuation coefficient based on the extracted optical signals, and may measure a triglyceride level based on the obtained effective attenuation coefficient by using a triglyceride estimation model. In this case, the processor 120 may obtain the effective attenuation coefficient by using an average signal of the extracted optical signals. The method of obtaining the effective attenuation coefficient by using the optical signals is not limited thereto.

First, the processor 120 may obtain the effective attenuation coefficient from the optical signals according to the following Equations 1 and 2.

$$\ln\left\{\rho^2 \frac{R(\rho)}{S_0}\right\} = -\mu_{eff}\rho + \ln\frac{3\mu_a}{2\pi\mu_{eff}} \qquad \text{[Equation 1]}$$

$$R(\rho) = \frac{S_0}{2\pi}\frac{3\mu_a}{\mu_{eff}}\frac{1}{\rho^2}e^{-\mu_{eff}\rho} \qquad \text{[Equation 2]}$$

Herein, $\mu_{eff}$ denotes the effective attenuation coefficient, $\rho$ denotes a distance between the light sources and detectors, $R(\rho)$ denotes a light intensity measured by a detector disposed at a distance $\rho$ from a light source, $S_0$ denotes a light intensity emitted by a light source, and $\mu_a$ denotes an absorption coefficient. Herein, $S_0$ may be a value measured in advance through experiments.

Then, the processor 120 may measure a triglyceride level based on the obtained effective attenuation coefficient by using a triglyceride estimation model that defines a correlation between the effective attenuation coefficient and the triglyceride level. In this case, the triglyceride estimation model may be generated by regression analysis or machine learning. A regression analysis algorithm may include simple linear regression, multi linear regression, logistic regression, proportional Cox regression, etc., and a machine learning algorithm may include Artificial Neural Network, Decision Tree, Genetic Algorithm, Genetic Programming, K-Nearest Neighbor, Radial Basis Function Network, Random Forest, Support Vector Machine, and/or deep-learning. However, the regression analysis and machine learning algorithms are not limited thereto.

In another example, the processor 120 may obtain an augmentation index as a feature based on the detected optical signals, and may measure a triglyceride level based on the obtained augmentation index. In this case, the processor 120 may obtain the augmentation index based on the optical signals detected by driving one or more light sources disposed at the center of the concentric circle.

For example, the processor 120 may extract optical signals from a plurality of detectors and two light sources disposed at the center of the concentric circle and emitting light in a green wavelength range, may obtain the augmentation index based on the extracted optical signals, and may measure a triglyceride level based on the obtained augmentation index. In this case, the processor 120 may obtain the augmentation index by using an average signal of the extracted optical signals. The method of obtaining the augmentation index by using the optical signals is not limited thereto.

First, the processor 120 may obtain the augmentation index based on the extracted optical signals by pulse wave analysis. The augmentation index indicates a change in the magnitude of a pulse pressure caused by reflection waves returning from the periphery to the heart, and is an index related to vessel stiffness. In this case, the augmentation index is an example of features which may be extracted by pulse wave analysis, and the processor 120 may also measure triglyceride levels by using features other than the augmentation index.

Figure 3A:
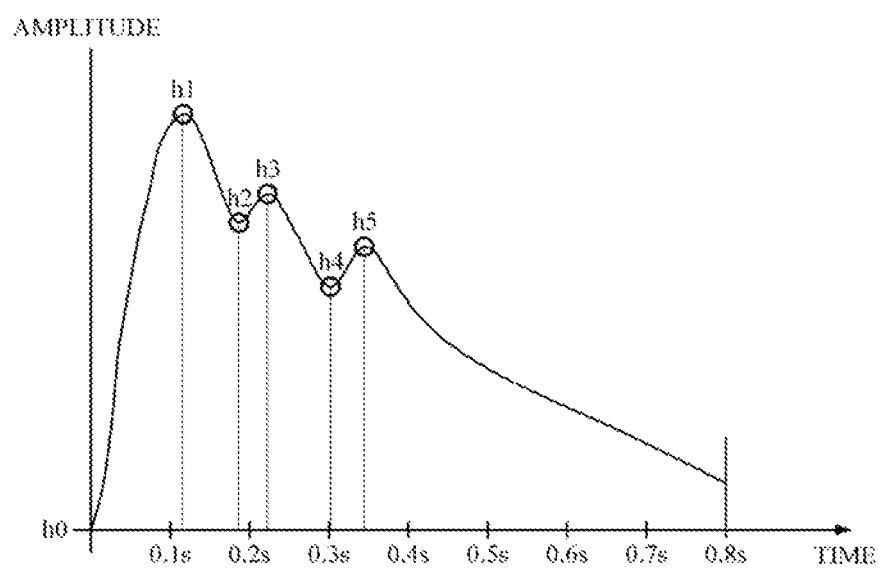
FIG. 3A is a diagram explaining an example of obtaining features by pulse wave analysis.

FIG. 3A is a diagram explaining an example of obtaining features by pulse wave analysis.

First, the processor 120 may extract waveforms of a pulse wave signal according to a change in concentration of a biological material in particle form, e.g., waveforms of a pulse wave signal (e.g. alternating current (AC) signal) obtained based on a signal of a detector disposed within a distance of 10 mm from a light source, may extract a representative waveform by using a method, such as an ensemble average of the extracted plurality of waveforms, may extract a region including a minimum point or a maximum point at the left and right of the representative waveform, and then may normalize a height of the waveform to a value between zero and one. Then, the processor 120 may predict a change in triglyceride level by using linear and non-linear algorithms based on a feature associated with blood viscosity (e.g., (h5+h4)/h2/h1, h5/h1) that varies according to a change in triglyceride level, a feature associated with vascular compliance (e.g., h3/h1, augmentation index), in the normalized waveform. In addition, the processor 120 may extract a variation in triglyceride level by using the normalized waveform as an input variable of a deep learning model, such as convolutional neural network (CNN), recurrent neural network (RNN), and/or convolutional recurrent neural network (CRNN), and by inputting feature vectors of each of the extracted waveforms or a difference therebetween to a regressor. The method of obtaining features by pulse wave analysis is not limited thereto.

Subsequently, the processor 120 may measure a triglyceride level based on the obtained augmentation index by using a triglyceride estimation model that defines a correlation between the augmentation index and the triglyceride level. In this case, the triglyceride estimation model may be generated by regression analysis or machine learning.

In another example, the processor 120 may measure a triglyceride level based on the effective attenuation coefficient and the augmentation index by using a predetermined triglyceride estimation model. In this case, the predetermined triglyceride estimation model is a model that defines a correlation between the effective attenuation coefficient and the augmentation index and the triglyceride level and may be generated by regression analysis or machine learning.

Figure 3B:
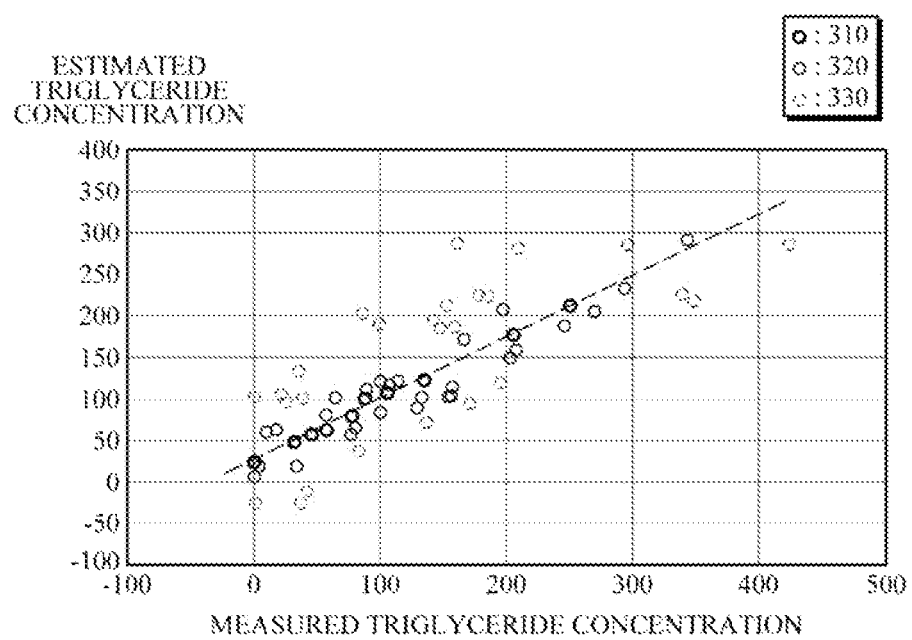
FIG. 3B is a graph showing a correlation between an estimated triglyceride concentration and an actually measured triglyceride concentration which are obtained by using an effective attenuation coefficient and an augmentation index.

FIG. 3B is a graph showing a correlation between an estimated triglyceride concentration and an actually measured triglyceride concentration which are obtained by using the effective attenuation coefficient and the augmentation index.

Referring to FIG. 3B, it can be seen that in a case (310) where the triglyceride level is estimated by using, for example, both the effective attenuation coefficient and the augmentation index as features, a correlation coefficient between the measured triglyceride concentration and the estimated concentration is 0.858, which is higher than a correlation coefficient of 0.815, obtained in a case (320) where only the effective attenuation coefficient is used, and a correlation coefficient of 0.65 obtained in a case (330) where only the augmentation index is used. Accordingly, by using both the effective attenuation coefficient and the augmentation index as features, rather than separately using each of the effective attenuation coefficient and the augmentation index, the accuracy of triglyceride estimation may be improved.

Next, the processor 120 may provide a user with health guidance, including, for example, warning information, diet information, and exercise information, based on the measured triglyceride level.

For example, upon measuring a triglyceride concentration, the processor 120 may generate health guidance information, such as warning information, diet information, and exercise information, which is customized for a user, based on the measured triglyceride concentration, and may provide the generated information to a user by using various output means. For example, the processor 120 may determine whether the measured triglyceride level is normal (e.g., under 150 mg/dL), borderline (e.g., 150 mg/dL to 199 mg/dL), or high (200 mg/dL). Upon determining that the triglyceride level is normal, the processor 120 may inform a user of the normal level and may guide the user to maintain the current diets or exercise. Alternatively, upon determining that the triglyceride level is at the borderline (e.g., 150 mg/dL to 199 mg/dL), or high (200 mg/dL), the processor 120 may provide warning information using an alarm, message, etc., in which case the processor 120 may provide the user with recommended diet or exercise which may be commonly applied.

The processor 120 may collect health data, such as a user's diet data (e.g., ingested food, amount of food intake, number of times of food intake per day, etc.), exercise data (type of exercise, amount of exercise per day, etc.), and/or health data such as blood pressure, body mass index (BMI) score, underlying condition, previous measured triglyceride levels, etc., through a user interface or from a healthcare application installed in another electronic device. The processor 120 may analyze the collected user information, and may guide the user on customized diet or exercise, etc., based on the analysis. For example, even when the current measured triglyceride level falls within the normal range, if there are factors that adversely affect the triglyceride level in the user's current diet data, exercise data, and/or the health data, the processor 120 may guide the user to remove or reduce the factors.

Figure 4:
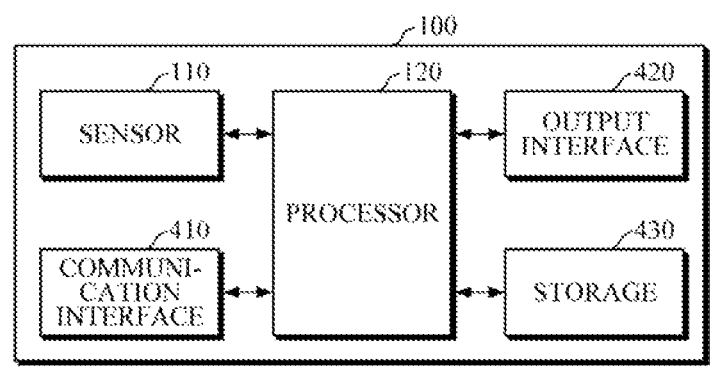
FIG. 4 is a block diagram illustrating an apparatus for measuring a triglyceride level according to another embodiment of the present disclosure.

FIG. 4 is a block diagram illustrating an apparatus for measuring a triglyceride level according to another embodiment of the present disclosure.

Referring to FIG. 4, the apparatus 100 for measuring a triglyceride level includes the sensor 110, the processor 120, a communication interface 410, an output interface 420, and a storage 430. The sensor 110 and the processor 120 are described in detail above, and thus a description thereof will be omitted below.

The communication interface 410 may communicate with another electronic device under the control of the processor 120 by using communication techniques. The communication interface 410 may transmit sensor data measured by the sensor 110 and triglyceride level data generated and processed by the processor 120 to the electronic device. By using the installed healthcare application, the electronic device may manage the triglyceride level data received from the apparatus 100 for measuring a triglyceride level, as well as body composition information such as skeletal muscle mass, basal metabolic rate, body water, body fat percentage, and/or exercise information such as step count, running distance, and may provide the data to a user. In addition, the communication interface 410 may receive user information and data, such as a user's health data, diet data, exercise data, etc., from the electronic device. Alternatively, the communication interface 410 may receive a learning model generated by the electronic device, or may receive a user's bio-impedance measured by an impedance sensor of the electronic device. In this case, the processor 120 may measure a user's triglyceride level by further using the bio-impedance received from the electronic device through the communication interface 410.

In this case, the communication techniques may include Bluetooth communication, Bluetooth Low Energy (BLE) communication, Near Field Communication (NFC), WLAN communication, Zigbee communication, Infrared Data Association (IrDA) communication, Wi-Fi Direct (WFD) communication, Ultra-Wideband (UWB) communication, Ant+ communication, WIFI communication, and mobile communication, but are not limited thereto.

The output interface 420 may output the sensor data measured by the sensor 110, the data generated and processed by the processor 120, and/or the data received through the communication interface 410. For example, the output interface 420 may output a user interface to a display so that a user may input a variety of information. Alternatively, the output interface 420 may output guidance information, including the triglyceride concentration, warning, diet, exercise, etc., which are generated by the processor 120, by using a display module, a speaker, and/or a haptic device.

Figure 5A:
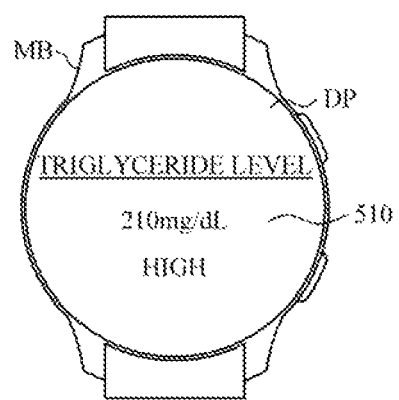
FIGS. 5A and 5B are diagrams illustrating an example of providing health guidance information.
Figure 5B:
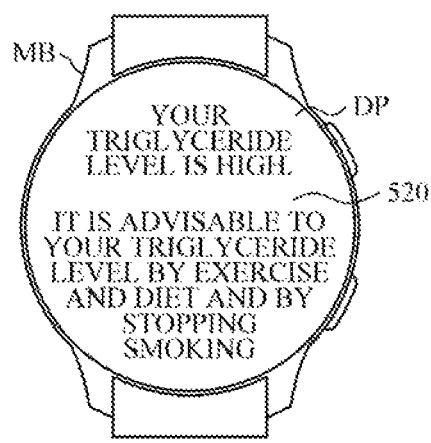

FIGS. 5A and 5B are diagrams illustrating an example of providing health guidance information which is performed by the processor 120 of FIGS. 1 and 4. However, the following examples are merely for convenience of explanation, and the present disclosure is not limited thereto.

Referring to FIG. 5A, the processor 120 may output, through the output interface 420, a graphic object 510 (text, icon, image, etc.), indicating a triglyceride concentration and/or whether the triglyceride level is normal, to a display DP of a main body MB. In this case, based on whether the triglyceride level is normal, the processor 120 may output graphic objects in different types and colors, so that the user may easily distinguish between normal and abnormal levels.

Referring to FIG. 5B, if the measured triglyceride level is abnormal as illustrated herein, the processor 120 may output a warning text 520, such as "your triglyceride level is high. It is advisable to manage your triglyceride level by exercise and diet and by stopping smoking."

Referring back to FIG. 4, the storage 430 may store various instructions which may be executed by the processor 120. In addition, the storage 430 may store data generated and/or processed by the sensor 110, the processor 120, the communication interface 410, etc., which may be referred to by the processor 120 during measurement of triglyceride levels. For example, the storage 430 may store health guidance information, such as user information, a user's diet data, exercise data, health data, recommended diet and exercise, learning model, and triglyceride estimation model.

The storage 430 may include at least one storage medium of a flash memory type memory, a hard disk type memory, a multimedia card micro type memory, a card type memory (e.g., an SD memory, an XD memory, etc.), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disk, and an optical disk, but is not limited thereto.

Figure 6:
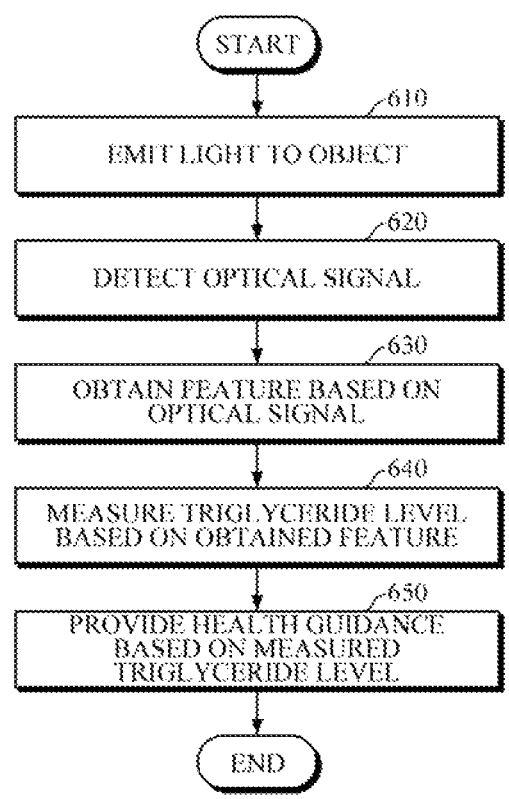
FIG. 6 is a flowchart illustrating a method of measuring a triglyceride level according to an embodiment of the present disclosure.

FIG. 6 is a flowchart illustrating a method of measuring a triglyceride level according to an embodiment of the present disclosure.

The method of FIG. 6 is an example of a method of measuring a triglyceride level performed by the apparatus 100 for measuring a triglyceride level, which is described in detail above, and thus will be briefly described below.

First, the apparatus for measuring a triglyceride level may emit light to an object by selectively driving a plurality of light sources disposed at a periphery in step 610.

Then, the apparatus for measuring a triglyceride level may detect optical signals, reflected or scattered from the object, by using a plurality of detectors disposed at a predetermined distance from the respective light sources in step 620. In this case, the predetermined distance between the respective light sources, disposed at the periphery, and the respective detectors may be in a range of from 2.5 mm to 15 mm. In this case, the light sources may also be disposed at the center, and a distance between the respective light sources, disposed at the center, and the respective detectors may be in a range of from 2.5 mm to 7.5 mm.

Subsequently, the apparatus for measuring a triglyceride level may obtain features based on the detected optical signals in step 630. In this case, the apparatus for measuring a triglyceride level may obtain an effective attenuation coefficient based on the optical signals which are detected by driving the plurality of light sources disposed at the periphery, and may obtain an augmentation index based on the optical signals which are detected by driving one or more light sources disposed at the center.

Next, the apparatus for measuring a triglyceride level may measure a triglyceride level based on the obtained features in step 640. For example, the apparatus for measuring a triglyceride level may measure the triglyceride level based on the obtained effective attenuation coefficient by using a triglyceride estimation model that defines a correlation between the effective attenuation coefficient and the triglyceride level, or may measure the triglyceride level based on the obtained the augmentation index by using a triglyceride estimation model that defines a correlation between the augmentation index and the triglyceride level. In addition, the apparatus for measuring a triglyceride level may measure the triglyceride level based on the effective attenuation coefficient and the attenuation coefficient by using a predetermined triglyceride estimation model. In this case, the predetermined triglyceride estimation model may be a model that defines a correlation between effective attenuation coefficient and the attenuation coefficient and the triglyceride level, and may be generated by regression analysis or machine learning.

Then, the apparatus for measuring a triglyceride level may provide a user with health guidance, including at least one of warning, diet, and exercise information, based on the measured triglyceride level in step 650. For example, upon measuring the triglyceride level, the apparatus for measuring a triglyceride level may generate health guidance information customized for the user, and may provide the information by using various output means.

Figure 7:
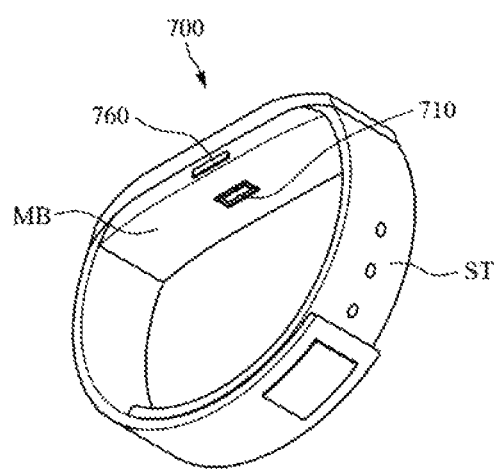
FIGS. 7 to 9 are diagrams illustrating examples of structures of an electronic device for measuring a triglyceride level.
Figure 8:
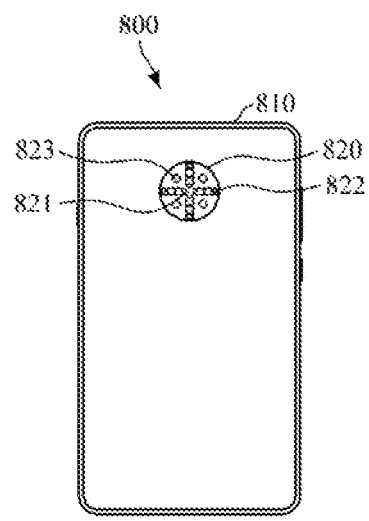
Figure 9:
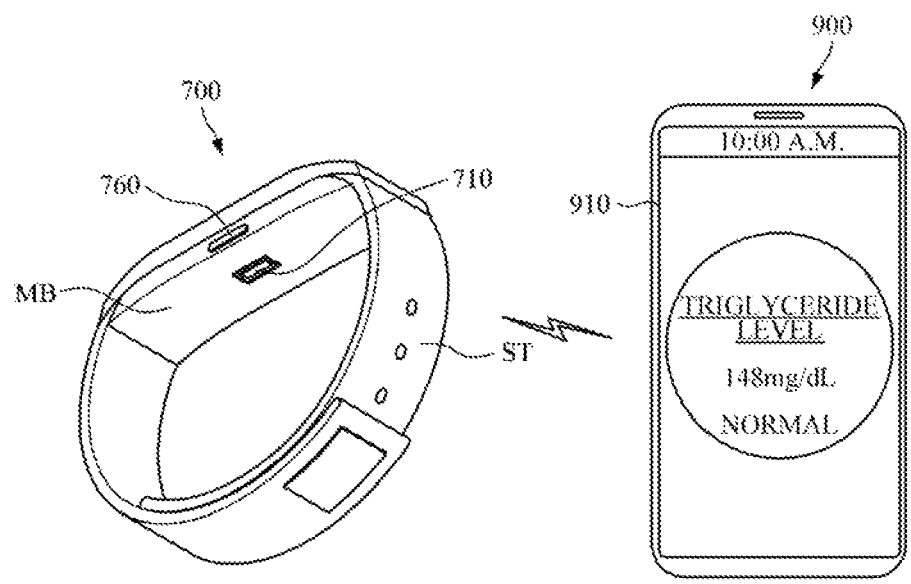

FIGS. 7 to 9 are diagrams illustrating examples of structures of an electronic device for measuring the triglyceride level as described above. However, the present disclosure is not limited to the illustrated examples.

Referring to FIG. 7, the electronic device may be implemented as a smart watch wearable device 700 including a main body MB and a wrist strap ST.

The main body MB may be formed in various shapes. A battery may be embedded in the main body MB and/or the strap ST to supply power to various components of the wearable device. The strap ST may be connected to both ends of the main body to allow the main body to be worn on a user's wrist, and may be flexible so as to be wrapped around the user's wrist. The strap ST may be composed of a first strap and a second strap which are separated from each other. One ends of the first strap and the second strap may be connected to both sides of the main body MB, and the first and second straps may be connected to each other via a fastening means formed at the other ends thereof. In this case, the fastening means may be formed as magnetic fastening, Velcro fastening, and/or pin fastening, but is not limited thereto. Further, the strap ST is not limited thereto, and may be integrally formed as a non-detachable band.

The main body MB may include a sensor 710 including a plurality of light sources and detectors which are disposed on a first surface of the main body, a processor, a display device disposed on a second surface of the main body, a storage including a memory for storing one or more instructions, and a communication interface. However, some of the storage and the communication interface may be omitted depending on the size and shape of a form factor and the like.

The processor mounted in the main body MB may be electrically connected to various components as well as the sensor 710. The processor may execute the one or more instructions stored in the memory, may selectively drive the plurality of light sources to emit light to an object, may obtain features based on optical signals which are reflected or scattered from the object and detected by the plurality of detectors, and may measure a triglyceride level based on the obtained features. In this case, the plurality of light sources may be disposed at the periphery, or one or more light sources may be disposed at the center. In addition, the plurality of detectors may be disposed at a predetermined distance from the respective light sources. In this case, the predetermined distance between the respective light sources, disposed at the periphery, and the respective detectors may be in a range of from 2.5 mm to 15 mm, and the distance between the respective light sources, disposed at the center, and the respective detectors may be in a range of from 2.5 mm to 7.5 mm.

A manipulator 760 may be formed on a side surface of the main body MB, as illustrated herein. The manipulator 760 may receive a user's command and may transmit the received command to the processor. In addition, the manipulator 760 may have a power button to turn on/off the wearable device 700.

A display device (e.g., display) may be provided on a front surface of the main body MB and may display various application screens, including bio-information, time information, received message information, and the like. For example, during estimation of the triglyceride level, the processor may output a text message for guiding a user to estimate the triglyceride level, and upon completing estimation of the triglyceride level, the display device may output an estimation result to the display device.

FIG. 8 is a diagram illustrating an example of a smart device. In this case, the smart device may include a smartphone, and a tablet PC. The smart device may include various embodiments of the aforementioned apparatus 100 for estimating a triglyceride level.

Referring to FIG. 8, a smart device 800 may include a main body 810 and a sensor 820 mounted on one surface of the main body 810. For example, the sensor 820 may include one or more light sources 821 disposed at the center thereof, a plurality of light sources 822 disposed at the periphery thereof, and a plurality of detectors 823 disposed between the light sources at the center and the periphery thereof. The structure of the sensor 820 is described in detail above, such that a detailed description thereof will be omitted.

In addition, a display may be mounted on a front surface of the main body 810. The display may visually output a triglyceride estimation result. The display may include a touch screen, and may receive information input through the touch screen and transmit the information to the processor.

FIG. 9 is a diagram illustrating an example of measuring a triglyceride level and providing health guidance information by interworking between wearable device 700 and a mobile device 900. For example, the wearable device 700 may measure a triglyceride level by using the sensor 710 and the processor, and the mobile device 900 may receive the triglyceride level measurement result from the wearable device 700 and may output the result to a display 910.

Embodiments can be realized as a computer-readable code written on a computer-readable recording medium. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that a computer-readable code is written thereto and executed therefrom in a decentralized manner. Functional programs, codes, and code segments needed for realizing the present invention can be readily deduced by programmers of ordinary skill in the art to which the invention pertains.

The present disclosure has been described herein with regard to preferred embodiments. However, it will be obvious to those skilled in the art that various changes and modifications can be made without changing technical conception and essential features of the present disclosure. Thus, it is clear that the above-described embodiments are illustrative in all aspects and are not intended to limit the present disclosure.

What is claimed is:

1. An apparatus for measuring a triglyceride level, the apparatus comprising:
   a sensor comprising:
     a plurality of peripheral light sources disposed at a periphery thereof, the plurality of peripheral light sources being configured to emit light toward an object,
     one or more central light sources disposed at a center thereof, the one or more central light sources being configured to emit light toward the object, and
     a plurality of detectors disposed at respective first predetermined distances from at least one peripheral light source of the plurality of peripheral light sources, the plurality of detectors being configured to detect optical signals reflected from or scattered by the object; and
   a processor configured to selectively drive the plurality of peripheral light sources and the one or more central light sources to cause the plurality of detectors to detect the optical signals reflected from or scattered by the object, to obtain features based on the detected optical signals, and to measure the triglyceride level based on the obtained features, wherein the processor is further configured to selectively drive the plurality of peripheral light sources among the plurality of peripheral light sources and the one or more central light sources to cause the plurality of detectors to detect the optical signals reflected from or scattered by the object, and to obtain an effective attenuation coefficient based on the detected optical signals.

2. The apparatus of claim 1, wherein the first predetermined distances are each within a range of 2.5 mm to 15 mm.

3. The apparatus of claim 1,
wherein the plurality of detectors are disposed at respective second predetermined distances from at least one central light source of the one or more central light sources, each of the second predetermined distances being within a range of 2.5 mm to 7.5 mm.

4. The apparatus of claim 3, wherein at least one of the plurality of peripheral light sources is configured to emit light in an infrared wavelength range, and at least one of the one or more central light sources is configured to emit light in a green wavelength range.

5. The apparatus of claim 1, wherein the plurality of detectors are arranged as a photodiode array.

6. The apparatus of claim 1, wherein the processor is configured to sequentially drive the plurality of peripheral light sources in a time-division manner.

7. The apparatus of claim 1, wherein the processor is configured to measure the triglyceride level based on the obtained effective attenuation coefficient by using a triglyceride estimation model that defines a correlation between the effective attenuation coefficient and the triglyceride level.

8. The apparatus of claim 1, wherein the processor is configured to selectively drive the one or more central light sources among the plurality of peripheral light sources and the one or more central light sources to cause the plurality of detectors to detect the optical signals reflected from or scattered by the object, and to obtain an augmentation index based on the detected optical signals.

9. The apparatus of claim 8, wherein the processor is configured to measure the triglyceride level based on the effective attenuation coefficient and the augmentation index by using a predetermined triglyceride estimation model.

10. The apparatus of claim 1, wherein the processor is configured to provide a user with health guidance, including at least one of warning information, diet information, or exercise information, based on the measured triglyceride level.

11. A method of measuring a triglyceride level, the method comprising:
selectively driving, by a processor, at least one of:
a plurality of peripheral light sources disposed at a periphery of a sensor to emit light toward an object, and
one or more central light sources disposed at a center of the sensor to emit light toward the object;
detecting optical signals reflected from or scattered by the object by using a plurality of detectors on the sensor, the plurality of detectors being disposed at respective first predetermined distances from at least one peripheral light source of the plurality of peripheral light sources;

obtaining features based on the detected optical signals; and
measuring the triglyceride level based on the obtained features, wherein the method further comprises selectively driving the plurality of peripheral light sources among the plurality of peripheral light sources and the one or more central light sources to cause the plurality of detectors to detect the optical signals reflected from or scattered by the object, and obtaining an effective attenuation coefficient based on the detected optical signals.

12. The method of claim 11, further comprising providing a user with health guidance, including at least one of warning information, diet information, or exercise information, based on the measured triglyceride level.

13. The method of claim 11, wherein the measuring the triglyceride level comprises measuring the triglyceride level based on the obtained effective attenuation coefficient by using a triglyceride estimation model that defines a correlation between the effective attenuation coefficient and the triglyceride level.

14. The method of claim 11,
wherein the obtaining the features further comprises;
selectively driving one or more of central light sources among the plurality of peripheral light sources and the one or more central light sources to cause the plurality of detectors to detect the optical signals reflected from or scattered by the object; and
obtaining an augmentation index based on the detected optical signals.

15. The method of claim 14, wherein the measuring the triglyceride level comprises measuring the triglyceride level based on the effective attenuation coefficient and the augmentation index by using a predetermined triglyceride estimation model.

16. A wearable device comprising:
a sensor comprising a plurality of detectors and a plurality of light sources comprising a plurality of peripheral light sources disposed at a periphery of the sensor, and one or more central light sources disposed at a center of the sensor;
a memory configured to store one or more instructions; and
a processor which, by executing the one or more instructions, is configured to:
selectively drive, to emit light toward an object, at least one of:
the plurality of peripheral light sources; and
the one or more central light sources,
obtain features by pulse wave analysis based on optical signals detected by the plurality of detectors, the optical signals being reflected from or scattered by the object, and
measure a triglyceride level based on the obtained features,
wherein the processor which, by executing the one or more instructions, is further configured to selectively drive the plurality of peripheral light sources among the plurality of peripheral light sources and the one or more central light sources to cause the plurality of detectors to detect the optical signals reflected from or scattered by the object, and to obtain an effective attenuation coefficient based on the detected optical signals.

17. The wearable device of claim 16, wherein the plurality of detectors are disposed at respective first predetermined distances from at least one peripheral light source of the plurality of peripheral light sources, the first predetermined distances being each within a range of 2.5 mm to 15 mm,
wherein the plurality of detectors are disposed at respective second predetermined distances from at least one central light source of the one or more central light sources, the second predetermined distances being each within a range of 2.5 mm to 7.5 mm.

\* \* \* \* \*